(12) United States Patent
Patil

(10) Patent No.: US 10,539,268 B2
(45) Date of Patent: Jan. 21, 2020

(54) OSCILLATION SYSTEMS

(71) Applicant: CHIGRU INNOVATIONS (OPC) PRIVATE LIMITED, Bangalore (IN)

(72) Inventor: Radhika Patil, Bangalore (IN)

(73) Assignee: Chigru Innovations (OPC) Private Limited, Bengaluru (IN)

( * ) Notice: Subject to any disclaimer, the term of this patent is extended or adjusted under 35 U.S.C. 154(b) by 0 days.

(21) Appl. No.: 16/421,502

(22) Filed: May 24, 2019

(65) Prior Publication Data
US 2019/0277445 A1    Sep. 12, 2019

Related U.S. Application Data

(63) Continuation-in-part of application No. 15/469,588, filed on Mar. 27, 2017, now Pat. No. 10,357,117.

(30) Foreign Application Priority Data

Jul. 13, 2016  (IN) .............................. 201641023936

(51) Int. Cl.
    *A47C 9/02*    (2006.01)
    *F16M 13/04*   (2006.01)
    (Continued)

(52) U.S. Cl.
    CPC ............... *F16M 13/04* (2013.01); *A47D 9/02* (2013.01); *F16M 7/00* (2013.01); *F16M 11/16* (2013.01);
    (Continued)

(58) Field of Classification Search
    CPC ...................................................... A47D 9/02
    (Continued)

(56) References Cited

U.S. PATENT DOCUMENTS 2,647,268 A *  8/1953  Lee ........................... A47D 9/02
                                                          5/104
5,398,353 A    3/1995  Sachathamakul
(Continued)

FOREIGN PATENT DOCUMENTS

DE    201111103612 B4    1/2017
EP         0620995 A1    10/1994
(Continued)

OTHER PUBLICATIONS

Chen-Chiung Hsieh, Dung-Hua Liou, David Lee, A real time hand gesture recognition system using motion history Image, Signal Processing Systems (ICSPS), 2010 2nd International Conference, Date of Conference: Jul. 5-7, 2010, pp. 1-1, IEEE, Dalian, China.
(Continued)

*Primary Examiner* — Fredrick C Conley
(74) *Attorney, Agent, or Firm* — Iphorizons PLLC; Narendra Reddy Thappeta

(57) ABSTRACT

A generic system for enabling resonant oscillations along multiple axes includes a load and an actuator. The load represents a mass or structure that is desired to be oscillated, and is subject to a restoring force by suitable mechanisms upon displacement of the load. The actuator is designed to rotate an eccentric mass about a first axis. Responsive to the rotation of the eccentric mass, the actuator is designed to cause the load to oscillate in the direction of each of a second axis and a third axis.

11 Claims, 12 Drawing Sheets

(51) Int. Cl.
*A47D 9/02* (2006.01)
*F16M 11/18* (2006.01)
*F16M 11/16* (2006.01)
*F16M 7/00* (2006.01)

(52) U.S. Cl.
CPC ....... *F16M 11/18* (2013.01); *F16M 2200/048* (2013.01)

(58) Field of Classification Search
USPC ...................................................... 5/104–109
See application file for complete search history.

(56) References Cited

U.S. PATENT DOCUMENTS

| | | |
|---|---|---|
| 2006/0071784 A1 | 4/2006 | Frank |
| 2009/0062622 A1 | 3/2009 | Lin |
| 2010/0052376 A1 | 3/2010 | Hopke et al. |
| 2010/0159428 A1* | 6/2010 | Grasing ............... A47D 13/105 434/258 |
| 2014/0192135 A1 | 7/2014 | Babineau et al. |
| 2015/0038072 A1 | 2/2015 | Cordier et al. |

FOREIGN PATENT DOCUMENTS

| | | |
|---|---|---|
| EP | 2976998 A1 | 1/2016 |
| WO | WO2010098702 A1 | 9/2010 |
| WO | WO/2012/057714 A1 | 5/2012 |
| WO | WO2014012070 A1 | 1/2014 |
| WO | WO2015091582 A1 | 6/2015 |

OTHER PUBLICATIONS

Hong Cheng, Lu Yang, Zicheng Liu, Survey on 3D Hand Gesture Recognition, IEEE Transactions on Circuits and Systems for Video Technology, Date of Publication: Aug. 18, 2015, pp. 1659-1673, vol. 26, Issue: 9, IEEE.
V. Bevilacqua M. Caprioli , M. Cortellino , M. Giannini , G. Mastronardi , V. Santarcangelo, Accuracy of 3D Face Recognition Frameworks, ISPRS TC VII Symposium—100 Years ISPRS, Vienna, Austria, Jul. 5-7, 2010, IAPRS, vol. XXXVIII.
Xia Han, Moi Hoon Yap, Ian Palmer, Face Recognition in the Presence of Expressions, Journal of Software Engineering and Applications, Published Online May 2012, pp. 1-9.
Saad Ahmed Sirohey , Masooda Begum , Iftikhar A. Sirohey , Zarina Sirohey, Human Face Segmentation and Identification (1993), date Nov. 1993, pp. 1-39.
Oya Celiktutan, Sezer Ulukaya and Bulent Sankur, A comparative study of face landmarking techniques, EURASIP Journal on Image and Video Processing 2013, Published: Mar. 7, 2013, pp. 1-27.
Maria Consuelo Ruiz, Automatic Face Landmarking in 3D, Centre for Vision, Speech and Signal Processing Faculty of Engineering and Physical Sciences University of Surrey, date Jan. 2011, pp. 1-246.
Evangelos Kalogerakis, Aaron Hertzmann, Karan Singh. Learning 3D Mesh Segmentation and Labeling, ACM Transactions on Graphics, vol. 29, No. 3, Jul. 2010, pp. 1-13.
Andrea Tagliasacchi, Hao Zhang, Daniel Cohen-Or, Curve skeleton extraction from incomplete point cloud,ACM Transactions on Graphics (TOG)—Proceedings of ACM SIGGRAPH 2009 , vol. 28 Issue 3, Aug. 2009, pp. 1-9, Article No. 71 ACM New York, NY, USA.
Julien Tierny, Jean-Philippe Vandeborre, and Mohamed Daoudi, 3D Mesh Skeleton Extraction Using Topological and Geometrical Analyses, 14th Pacific Conference on Computer Graphics and Applications (Pacific Graphics 2006), Oct. 2006, pp. 1-10, Tapei, Taiwan.
Anne Verroust, Francis Lazarus, Extracting Skeletal Curves from 3D Scattered Data, Shape Modeling and Applications, 1999. Proceedings. Shape Modeling International '99. International Conference , Date of Conference: Mar. 1-4, 1999, pp. 1-8, IEEE, Aizu-Wakamatsu, Japan, Japan.
Oscar Kin-Chung Au, Chiew-Lan Tai, Hung-Kuo Chu, Daniel Cohen-Or, Tong-Yee Lee, Skeleton Extraction by Mesh Contraction, ACM Transaction on Graphics (Proceedings of SIGGRAPH 2008, vol. 27 Issue 3, Aug. 2008 , Article No. 44, pp. 1-10.
Julien Tierny , Jean-Philippe Vandeborre , Mohamed Daoudi, Topology driven 3D mesh hierarchical segmentation, Shape Modeling and Applications, 2007. SMI '07. IEEE International Conference, Date of Conference: Jun. 13-15, 2007, pp. 1-3, IEEE, Lyon, France.
International Search Report and Written Opinion dated Sep. 1, 2017 from International Application No. PCT/IN2017/050277 , 08 pages.

* cited by examiner

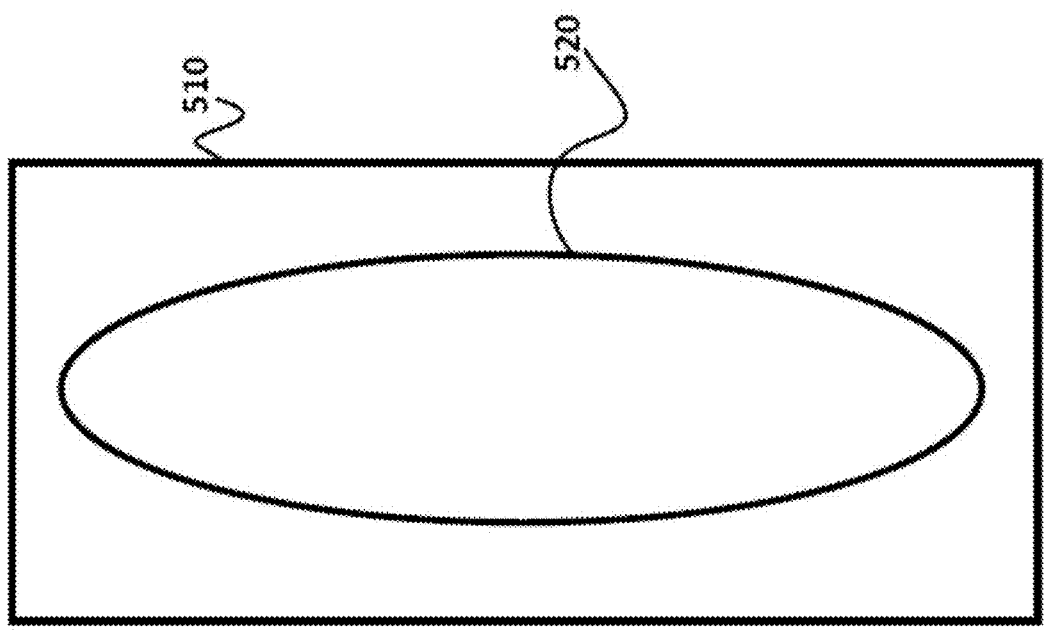
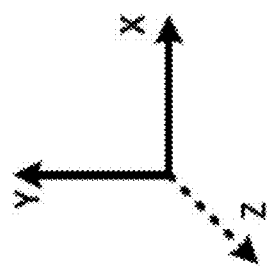
FIG. 5

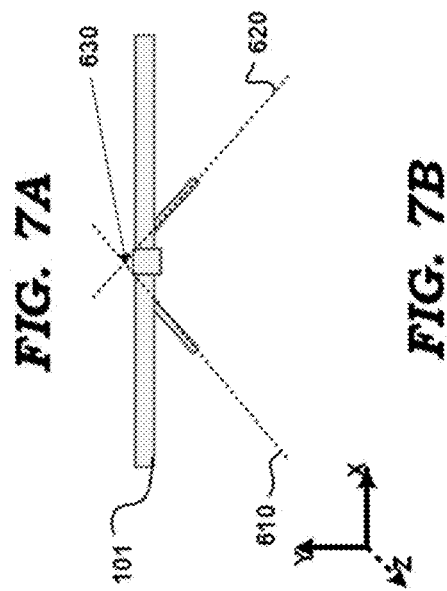
FIG. 7A
FIG. 7B
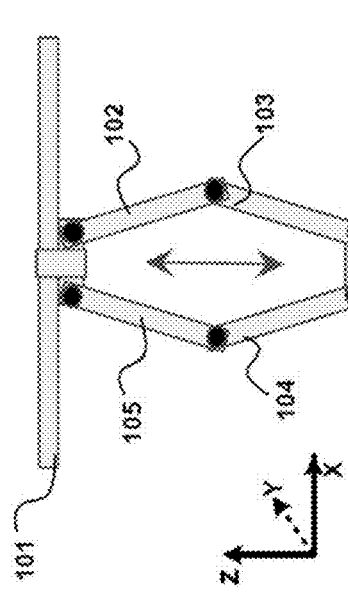
FIG. 6A
FIG. 6B

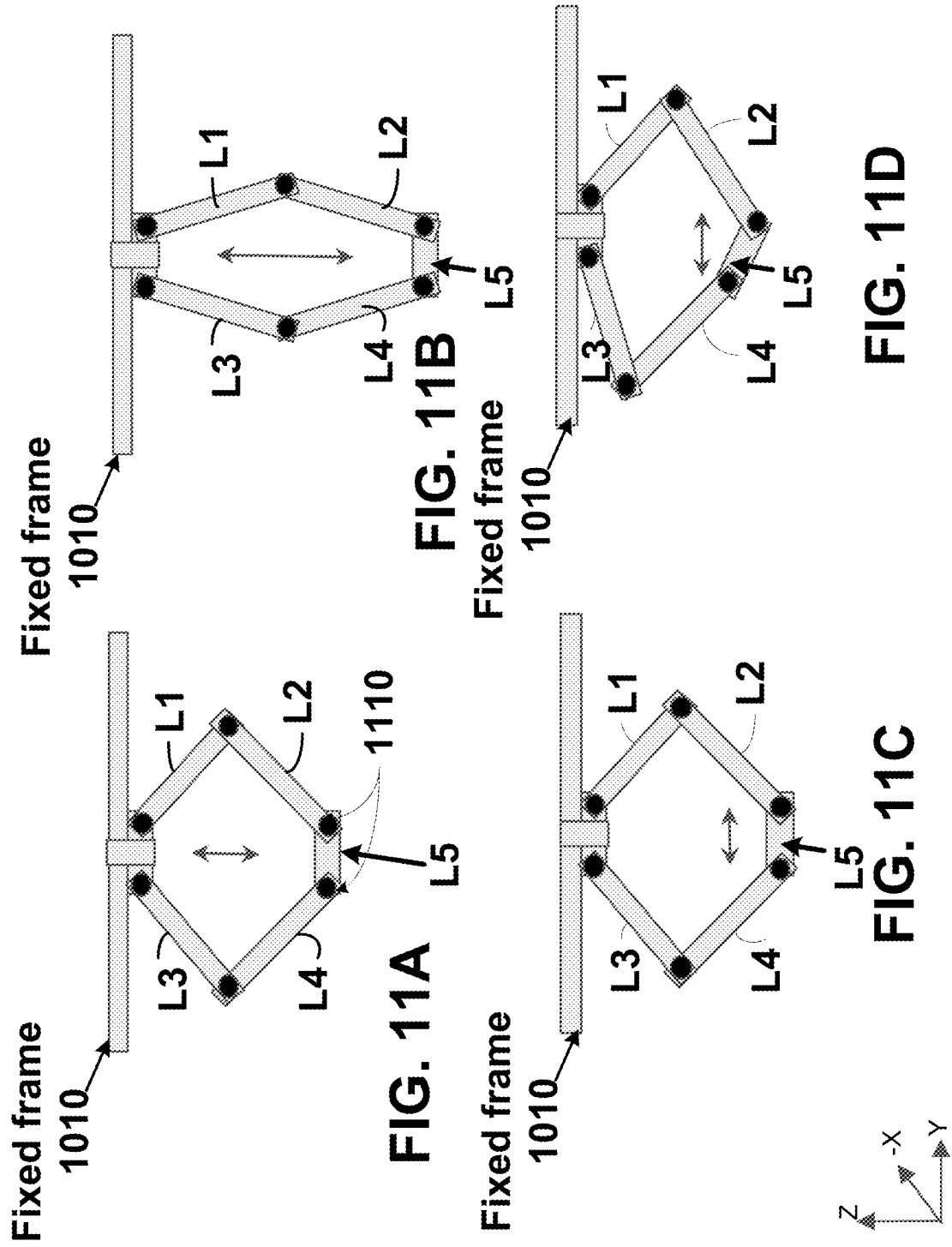

US 10,539,268 B2

OSCILLATION SYSTEMS

PRIORITY CLAIM AND RELATED APPLICATION

The instant patent application is a continuation-in-part of, and claims priority from, co-pending U.S. patent application entitled, "ROCKING CRADLE", application Ser. No. 15/469,588, Filed: 27 Mar. 2017, naming Radhika Patil as the inventor, which in turn claims priority from India provisional patent application entitled, "Cradle for Rocking an Infant", Application Number: 201641023936, Filed: 13 Jul. 2016, also naming Radhika Patil as the inventor, both of which are incorporated in their entirety herewith, to the extent not inconsistent with the content of the instant application.

BACKGROUND

Technical Field

Embodiments of the present disclosure relate generally to oscillation systems.

Related Art

Oscillation refers to to-and-fro motions as is well known in the relevant arts. Oscillation systems are used in systems such as cradles. Aspects of the present disclosure are related to oscillation systems.

BRIEF DESCRIPTION OF THE VIEWS OF DRAWINGS

Example embodiments of the present disclosure will be described with reference to the accompanying drawings briefly described below.

FIG. 5 is a diagram used to illustrate how oscillations of a load in a cradle are constrained in an embodiment of the present disclosure.

FIGS. 6A and 6B are diagrams showing corresponding views at a first displacement of a frame system used in a cradle in an embodiment of the present disclosure.

FIGS. 7A and 7B are diagrams showing corresponding views at a second displacement of a frame system used in a cradle in an embodiment of the present disclosure.

FIGS. 11A, 11B, 11C and 11D are diagrams illustrating structures for restricting oscillations of a system to desired dimensions, in an embodiment of the present disclosure.

Figure 1:
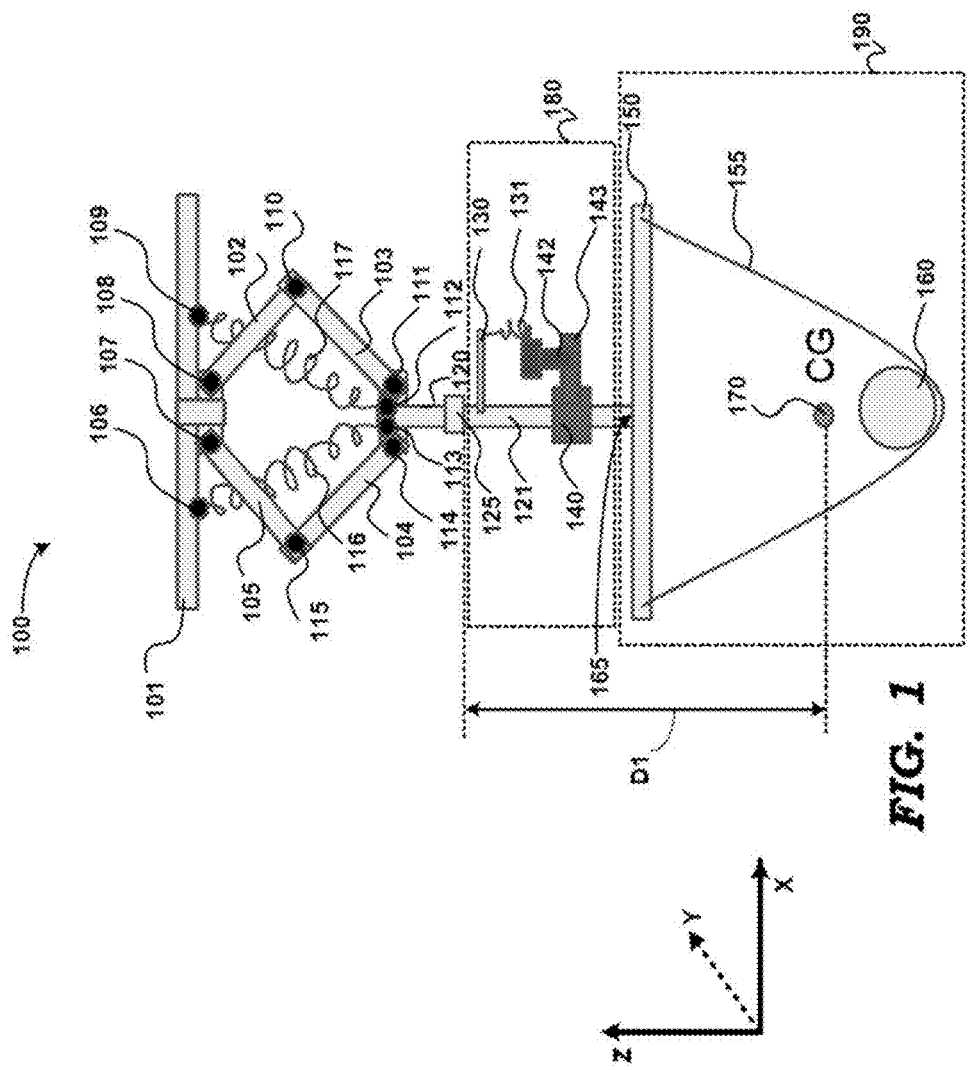
FIG. 1 is a block diagram of an example cradle in an embodiment of the present disclosure.

In the drawings, like reference numbers generally indicate identical, functionally similar, and/or structurally similar elements. The drawing in which an element first appears is indicated by the leftmost digit(s) in the corresponding reference number. The orientation of the X, Y and Z axes in a corresponding Figure is also noted in the Figure.

DETAILED DESCRIPTION

1. Overview

According to an aspect of the present disclosure, a system includes a load and an actuator. The load is subject to a restoring force upon displacement of the load from a rest position. The actuator is designed to rotate an eccentric mass about a first axis. Responsive to the rotation of the eccentric mass, the actuator is designed to cause the load to oscillate in the direction of each of a second axis and a third axis. The first axis, the second axis and the third axis are all orthogonal to each other.

Several aspects of the disclosure are described below with reference to examples for illustration. It should be understood that numerous specific details, relationships, and methods are set forth to provide a full understanding of the disclosure. One skilled in the relevant arts, however, will readily recognize that the disclosure can be practiced without one or more of the specific details, or with other methods, etc. In other instances, well-known structures or operations are not shown in detail to avoid obscuring the features of the disclosure.

2. Example Cradle

FIG. 1 is a diagram of a cradle 100 in an embodiment of the present disclosure. The diagram is shown in the ZX plane, with the Y direction being into the page, as indicated by the X, Y and Z axes.

Cradle 100 is supported by a fixed frame 101. Fixed frame 101 may be connected to the ceiling or floor of a room, or any other stable surface by suitable means, not shown. Shaft 120 is shown connected to fixed frame 101 via straight-line frames 102, 103, 104 and 105. Shaft 120 is connected to shaft 121 via pivot 125, which allows shaft 121 (and portions of the cradle connected to shaft 121, as described below) to be rotated about the X axis. All pivots in FIG. 1 may be provided with damper control, and an example generic pivot with damper control is illustrated and described further below with respect to FIGS. 8A and 8B. The damper control in a pivot can be used as manual over-ride to restrict the corresponding motion about that pivot.

One end of straight-line frame 102 is connected to fixed frame 101 via a pivot 108. One end of straight-line frame 103 is connected to shaft 120 via a pivot 111. The other ends of frames 102 and 103 are connected by pivot 110. One end of straight-line frame 105 is connected to fixed frame 101 via a pivot 107. One end of straight-line frame 104 is connected to shaft 120 via a pivot 114. The other ends of frames 105 and 104 are connected by pivot 115.

Spring 116 is connected between fixed point 106 on fixed frame 101 and fixed point 113 on shaft 120. Spring 117 is connected between fixed point 109 on fixed frame 101 and fixed point 112 on shaft 120.

Figure 2:
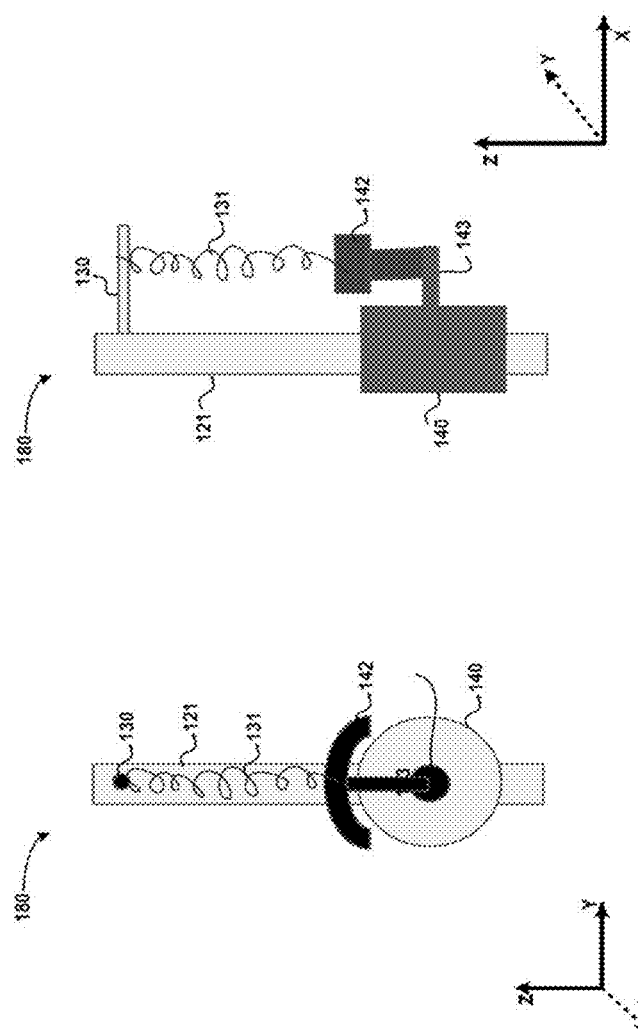
FIGS. 2A and 2B are diagrams of different view of an actuator used in a cradle in an embodiment of the present disclosure.

Motor 140 (which may be implemented, for example, as a DC motor, DC servo motor or a stepper motor) is fixed to shaft 121, and motor shaft (shaft of the motor) 143 is along the X direction in FIG. 1. An eccentric mass 142 is connected to motor shaft 143, and is rotatable about the X direction by activating the motor. The eccentric mass 142 is connected to shaft 121 via a spring 131 and a support 130. The combination of motor 140, motor shaft 143, spring 131, shaft 121 and eccentric mass 142 is referred to herein as actuator 180. FIGS. 2A and 2B show the actuator 180 in greater detail. FIG. 2A shows the actuator 180 as viewed from the X axis, while FIG. 2B shows the actuator 180 as viewed from the Y axis.

Figure 3:
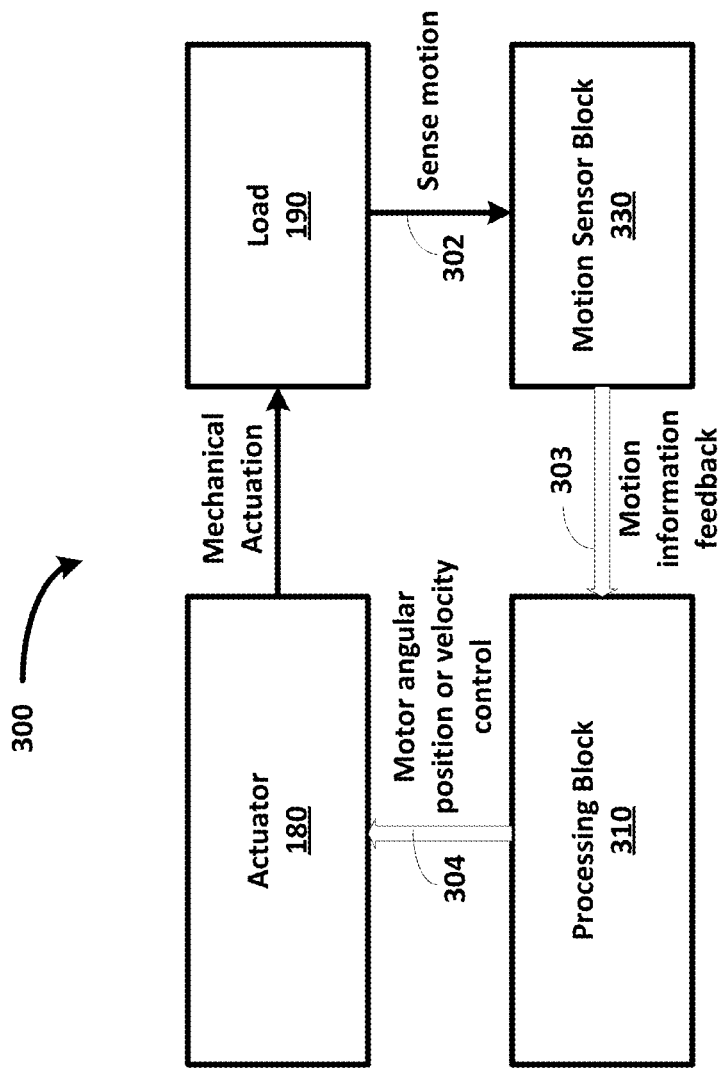
FIG. 3 is a block diagram of a control system used to oscillate a cradle in an embodiment of the present disclosure.

Dock 150 houses the electronics and control system that are designed to control the rocking of cradle/cradle 100, and which are described in greater detail with respect to FIG. 3. Dock 150 also houses the power supply (e.g., batteries) for the electronics (including processing block and non-volatile memory to store instruction which are executed by the processing block) and control system. Hammock 155 represents a bed/holder (e.g., made of cloth or other suitable material) for holding an infant 160, and is suitably attached to dock 150. The combination of dock 150, hammock 155 and the infant 160 is referred to herein as load 190. Point 170 represents the center of gravity (CG) of load 190 plus actuator 180. Dock 150 is attached to shaft 121 via a pivot 165 that allows the load 190 to be rotated about the Z axis, while still being attached to shaft 121. Such an arrangement allows the rocking to be along head-to-toe or side-to-side axes of the infant. In an embodiment, dock 150 is connected to shaft 121 using a ratcheted pivot so that load 190 can be rotated about the pivot.

According to one aspect of the present disclosure, load 190 can be made to rock (or swing) multiple directions using a single actuator structure. While the example actuator described below causes oscillations (back and forth motion) in the vertical (Z direction) and/or in a horizontal direction (along Y axis), alternative embodiments can be employed with other directions of oscillations as will be apparent to one skilled in the relevant arts by reading the disclosure herein.

2. Multidimensional Oscillations Using a Single Actuator

As can be seen from FIG. 1, the motor 140 rotates the eccentric mass 142 about the X-axis i.e., the eccentric mass 142 moves in the YZ plane. Due to the rotation of the eccentric mass 142, the direction of centrifugal force exerted by the eccentric mass 142 on the motor shaft 143 undergoes a rotation. Hence a rotating force is applied to the load 190. As is well known in the relevant arts, rotation in a plane is equivalent to two simultaneous oscillations in two dimensions. The term oscillation as used herein means simple harmonic motion (as against vibration). Thus, the rotary motion of eccentric mass 142 can generate oscillating motion of load 190 along the vertical (Z) and horizontal (Y) dimensions/axes. Thus, rocking of load 190 (and thus the infant 160) is possible in both vertical and horizontal directions using a single mechanism. If the horizontal and the vertical motions/oscillations are tuned to different frequencies and the Q (quality factor, which defines the ratio of energy stored to the energy lost per cycle in the corresponding oscillation) of the oscillations is high enough, selective oscillations are possible in each (Y and Z) direction by tuning/adjusting the rotation rate of motor shaft 143 to match the natural frequency of oscillation in each direction.

The spring system formed by springs 116 and 117 (FIG. 1) is used as the potential energy storage element for vertical resonant oscillations. For horizontal oscillations, the combination of actuator 180 and load 190 behaves as a pendulum (which can oscillate about pivot 125 in the X direction, as noted above), and the potential energy due to gravity is used for energy storage. The mass of the actuator 180 plus load 190 is the kinetic energy storage element for both vertical and horizontal oscillations.

It may be readily appreciated that the spring system and gravity are respective mechanisms (which together can be viewed as a single mechanism as well) to apply a restoring force to the load upon displacement from a rest position of the load.

To setup resonance, feedback is used as illustrated with respect to FIG. 3. Motion control system 300 is shown containing actuation mechanism (actuator) 180, load 190, motion sensor block 330 and a processing block 310. Motion sensor block 330 may include one or more motion sensors (for example, in the form of accelerometers). The sensors may be implemented in the form of MEMS (micro-electro-mechanical system) components.

Processing block 310 may include one or more processors/CPUs that execute instructions stored in a non-volatile memory to enable several features of the present disclosure, including rocking of load 190 in the vertical (Z) or horizontal (Y) directions. Processing block 310 provides actuation signal(s) (indicated as motor angular position or velocity control on path 304 in FIG. 4) to motor 140 in actuator 180 to rotate motor 140 in a desired manner, as noted below. Actuator 180 moves/oscillates load 190 (mechanical actuation). Although not shown in the Figures in the interest of conciseness, processing block 310 may be connected to input/output devices such as keys pads/display, etc. Further, processing block 310 is assumed to be connected to transmitter(s) and receiver(s) to enable processing block 310 to transmit and receive messages to/from external devices/systems. Blocks 310 and 330 are housed in dock 150 (shown in FIG. 1).

Motion sensor block 330 may contain one or more accelerometers (e.g., one oriented in each of the three axes X, Y and Z), senses the motion of load 190 (the sensed parameter shown as being received on path 302), and obtains information representing acceleration experienced by load 190. Motion sensor block 330 provides the information representing acceleration to processing block 310 via path 303 (noted as containing motion information feedback in FIG. 3). Position and velocity of load 190 are derived by processing block 310 using integration. If motor 140 has position control (i.e., angular position of eccentric load 142 is controllable, as for example in a stepper motor), then phase of the motor 140 is maintained (by processing block 310 via path 304) such that the force applied is phase-locked with respect to the position of the load. As is well known in the relevant arts, for setting up resonance in a mechanical system, force on a load should be phase-locked to the position of the load. At resonance, the position of the load under motion is in phase quadrature with the force applied. For high Q systems, at frequencies below resonance, the position of the load is in-phase with the force applied and at frequencies above resonance, the position of the load is anti-phase with the force applied.

If motor 140 has only velocity control, a small actuation is first presented to the load 190 by running the motor 140 (under control from processing block 310) for a small duration and then stopping the motor. The natural frequencies in the vertical (Z) and horizontal (Y) directions are ascertained (based for example on the rotational frequency of motor 140 and the corresponding acceleration sensed by motion sensor 330) by processing block 310 from the small oscillations thus set-up. Then, the motor 140 is run at the natural frequency (along the vertical/Z direction, or in the horizontal/Y direction, depending on whether oscillation/rocking is desired in the vertical or horizontal directions) desired to setup the oscillations. Once the oscillations pick up, the motor frequency is swept (by processing block 310) in a slow manner (by processing block 310) to maximize the amplitude of oscillations (using typical peak detection techniques). Irrespective of whether the motor has position control or velocity control, if the amplitude of the oscillation (horizontal or vertical) crosses/attains the maximum limit, the velocity of the motor is changed slowly to operate the system slightly off resonance so that the amplitude is limited to the maximum limit.

Figure 4A:
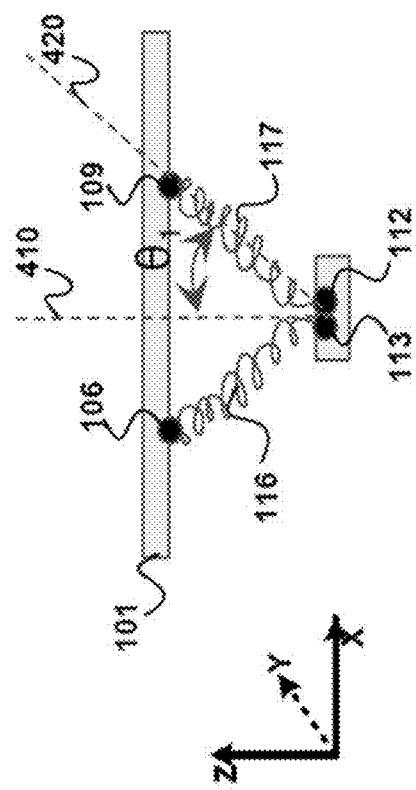
FIGS. 4A and 4B are diagrams showing a spring system for different masses of a load in a cradle in an embodiment of the present disclosure.
Figure 4B:
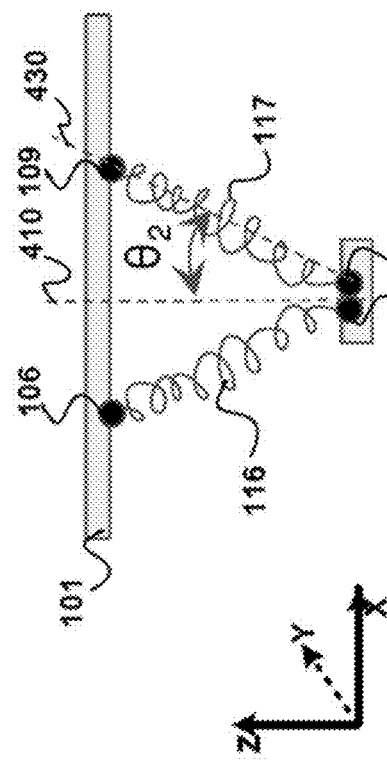

In the vertical direction, the natural frequency of oscillation is determined by the sum of masses of the load 190, actuator 180 and the effective spring constant (Ke) of the spring system (referred to herein as S1) formed by springs 116 and 117. The natural frequency of oscillation $\omega_v$ is given by the following Equation:

$$\omega_v = \text{sqrt}(Ke/M) \qquad \text{Equation 1}$$

wherein,

Ke equals $2*K*\cos^2(\theta)$, K being the natural spring constant of each of springs 116 and 117 of S1, $\theta$ is the angle between vertical axis 410 and the axis 420 of spring 117 (or 116), as illustrated in FIGS. 4A and 4B with example angles $\theta_1$ and $\theta_2$, M equals [(mass of load 190)+(mass of actuator 180)+(mass of spring system S1)+(sum of masses of straight-line frames 102, 103, 104 and 105)−(mass of eccentric mass 142)], and 'sqrt' is a square root operator.

Figure 9:
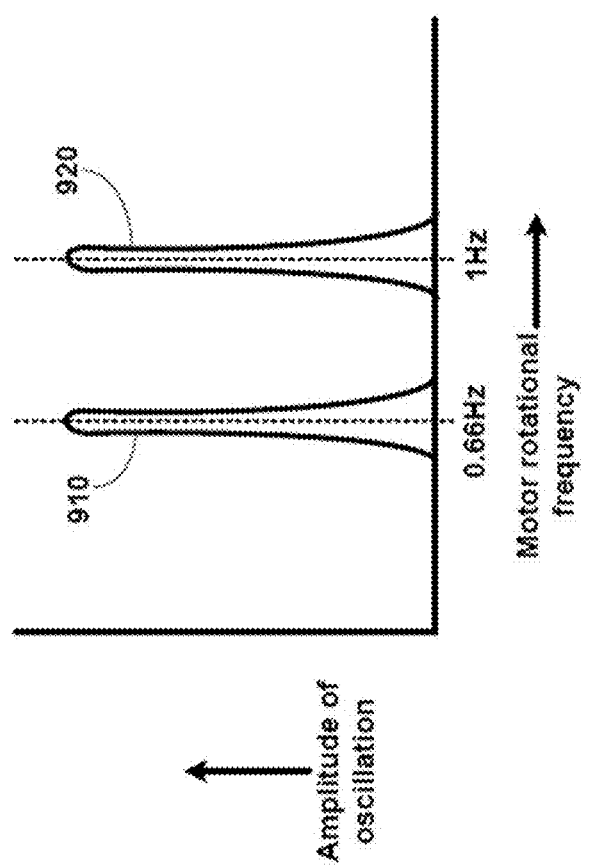
FIG. 9 is a diagram illustrating the oscillation responses with respect to rotational frequencies of an actuator in a cradle, in an embodiment of the present disclosure.

In the horizontal direction, the natural frequency of oscillation is determined by the effective distance D1 (as indicated in FIG. 1) of the center of gravity 170 of the load and actuator system from the pivot 125, as shown in FIG. 1. The natural frequency of oscillation equals $\omega_h = \text{sqrt}(g/D1)$, wherein g is acceleration due to gravity. By tuning the distance D1 and the spring constant of the spring system S1, the horizontal and the vertical frequencies can be separated. For example, the horizontal oscillation frequency can be tuned to approximately 0.66 Hz (Hertz) and the vertical oscillation frequency can be tuned to approximately 1 Hz. To operate cradle 100 in vertical oscillation mode, the motor 140 can be run at 1 Hz, and to operate cradle 100 in horizontal oscillation mode, the motor 140 can be run at 0.66 Hz. The oscillation response (amplitude) in the horizontal and vertical directions may be represented by responses 910 and 920 shown in FIG. 9. It may be observed that when the rotational frequency of motor 140 is 0.66 Hz, there is no oscillation in the vertical direction. When the motor rotational frequency is 1 Hz, there is no oscillation in the horizontal direction. Such selective response is enabled by the high Q factor corresponding to each mode. Thus, by design of the corresponding components that determine the natural frequency of oscillations in the vertical and horizontal directions to have high Q factors, and by operating motor 140 at the natural frequencies in the horizontal direction and vertical direction respectively, oscillations in the other direction (vertical and horizontal respectively) can be damped out, and thus prevented.

To operate cradle 100 in a vertical plus horizontal oscillation mode, the motor 140 can be run (by processing block 310) in a fashion such that the eccentric mass 142 exhibits a motion that combines the two frequencies. Such a complicated motion with two frequency components is possible if the motor has angular position control, for example, using a stepper motor or a regular speed controlled motor with optical encoder for position feedback. The intended motions for each of the two oscillations (vertical and horizontal) are just added, and motor 140 is operated accordingly. The intended motion will be just the sum of the two sinusoids. Another method is also to simply time-multiplex by repeatedly oscillating load 190 along the vertical direction for N cycles and along the horizontal direction for another N cycles.

An additional motion for the load is obtained when the load is turned about pivot 165 by ninety degrees. Pivot 165 provides an option of oscillation of the baby in the head-to-toe axis or the side-to-side axis.

According to another aspect of the present disclosure, the design of cradle 100 is such that the frequency of resonant oscillations (vertical and horizontal, as noted above) of the cradle changes minimally with change in mass of the baby 160. In particular, the spring system S1 (made up of springs 116 and 117) is designed to ensure that with change in mass of the baby, minimal change in oscillation frequency (vertical or horizontal) occurs. In addition, a restricting mechanism is used to prevent unintended motion in the third axis (perpendicular to the vertical and the horizontal directions) which may be caused due to externally induced forces or leakage of oscillation energy in that axis. These aspects are described next.

3. Keeping the Oscillation Frequencies Constant

As can be seen from FIG. 1, the spring system S1 consists of two springs 116 and 117. The two springs are arranged in a V shape. The spring constant of either of springs 116 and 117 is given the expression K=d(F)/d(z), wherein F is the force due to the extension of the springs, and z is the displacement in vertical direction (i.e., along axis 410), and d(F)/d(z) represents the rate of change of force F with respect to displacement z.

FIG. 4A shows the spring system S1 when load 190 has a first mass M1. $\theta_1$ is the angle between vertical axis 410 and the axis 420 of spring 117 (or 116) for the mass M1. Spring constant corresponding to the scenario of FIG. 4A is:

$$K1 = 2*K*\cos^2(\theta_1) \qquad \text{Equation 2}$$

wherein K is the natural spring constant of each of springs 116 and 117.

When the mass of load 190 increases to a greater mass M2 due to increase in baby's mass, the V shape becomes more elongated and sharp to balance the higher weight, as indicated in FIG. 4B. $\theta_2$ is the angle between vertical axis 410 and the axis 430 of spring 117 (or 116) for the mass M2. Spring constant corresponding to the scenario of FIG. 4B is:

$$K2 = 2*K*\cos^2(\theta_2) \qquad \text{Equation 3}$$

wherein K is the natural spring constant of each of springs 116 and 117.

It may be observed that K2 is greater than K1. Thus, the effective spring constant in vertical direction becomes greater with increase in mass of load 190. With lighter babies, the V is shorter in height and wider. The frequency of oscillation in the vertical direction (Z axis) is given by equation 1 above. Since the effective spring constant increases as M increases, the vertical oscillation frequency remains nearly constant. The actual variation can be minimized by varying the length and default angle of the V shape. Practically, a variation of less than 15% can be achieved over a wide range of mass M of load 190.

The frequency of oscillation along the horizontal (Y) direction does not change much as the sum of masses of actuator 180 and hammock 155 is relatively small compared to the mass of the baby 160, and the CG 170 remains nearly at the same point (i.e., as when mass of load 190 is M1) even with change in baby's mass.

According to another aspect of the present disclosure, safety is provided by restricting the motion/oscillation of the cradle to be within desired limits, as described next.

4. Safety

In FIG. 5, the base (not shown in FIG. 1) of cradle 100 is the rectangular portion marked 510. A rectangular shape for base 510 may be desired to give cradle 100 a sleek appearance. In this example, the base 510 is shown as being longer in the Y-dimension (along Y axis). Therefore, motion of load 190 in X-dimension should be restricted to make sure that CG 170 does not go beyond the base and cause instability. Ellipse 520 represents the outer limits of motion of load 190.

The straight-line frame system containing frames 102, 103, 104 and 105 (FIG. 1) restricts the motion in the vertical dimension only, as illustrated with respect to FIGS. 6A, 6B, 7A and 7B. FIGS. 6A and 6B respectively show elevation and plan views of the straight line frame system for a first vertical position. FIGS. 7A and 7B respectively show elevation and plan views of the straight line frame system for a second vertical position.

It can be observed from FIGS. 6A, 6B, 7A and 7B that frames 102 and 103 are constrained (by design) to move only on a plane represented by 620 (the plane is into the page), which is at an angle θ with respect to the plane (looking into the page) on which fixed frame 101 lies. Similarly, frames 104 and 105 are constrained (by design) to move only on a plane represented by 610 (the plane is into the page) which is at an angle θ (in the opposite sense) with respect to the plane (looking into the page) on which fixed frame 101 lies. The intersection 630 of the two planes 610 and 620 forms a straight line (again into the page), and hence motion of load 190 along the vertical (Z) direction is restricted to be only along this vertical line 630.

The pivot 125 additionally provides freedom of motion in the YZ plane about the X axis. Therefore, motion along the X-dimension is minimized.

It is noted here that side-to-side (horizontal) oscillations can also be prevented by restricting rotation about pivot 125, and up-down (vertical) oscillations can be prevented by restricting pivot 111 or pivot 114, without the need for straight-line frame system containing frames 102, 103, 104 and 105, which in such case can be implemented to all lie in a plane (and not as in FIGS. 6A, 6B, 7A and 7B).

In an alternative embodiment of the present disclosure, angle θ in FIG. 6B is made zero degrees by design, and pivot 125 is not implemented. Thus, both side-to-side and up-down oscillations are possible at all times.

According to another aspect of the present disclosure, the design of cradle 100 results in increased efficiency (lesser power consumption from the battery) when vertical or horizontal oscillations/rocking of load 190 is desired, as described next.

5. Higher Efficiency

It may be appreciated from the foregoing description that a resonating mechanism is used to implement oscillations of load 190 in each of vertical and horizontal directions. Hence the power requirements will be much lower compared to conventional non-resonant mechanisms. In addition, to improve the efficiency of the system, higher Q factors are needed. High Q resonant systems need higher mass, higher spring constant and lower friction. But the mass and spring constant are fixed by other parameters of the system. Therefore, minimizing friction is very important. For example, consider the mechanism that restricts the motion to vertical motion (straight frames 102, 103, 104 and 105). Alternative mechanisms such as a slider mechanism in the vertical direction have lot of inherent friction in the sliding portion. The mechanism of the straight frame 102, 103, 104 and 105 on the other hand has very minimal friction only in the form of rotation on pivots 107, 108, 110, 111, 114 and 115. Rotation inherently has less friction as compared to sliding mechanisms.

In the actuation mechanism, eccentric mass 142 is rotated about the X axis. Apart from the energy required to sustain the motion of the eccentric mass, in each cycle, the eccentric mass has to be lifted up and then let to fall down. This action results into a lot of wastage of energy. This is especially true when regenerative braking is not possible given the construction of many motors. To make the action regenerative, spring 131 is used to compensate for the force of gravity. This not only reduces the losses due to gravity, it also reduces the maximum load on motor 140. Hence a smaller motor 140 can be chosen and operated in higher efficiency operating conditions.

Other benefits and features of cradle 100 are now described.

6. Ensuring Safety Using Feedback

Dock 150 houses the control systems, related electronics (including processing block 310) and power supply. One of the critical components of the control system is the feedback mechanism. In this case, the role is played by motion sensor block (of FIG. 3), which consists of at least one accelerometer, and may optionally have a gyroscope. Dock 150 is mechanically strongly coupled to hammock 155, and hence any motion of hammock 155 is picked up by the sensors in motion sensor block 330. Processing block 310 (FIG. 3) continuously monitors the data from the sensor(s) and takes critical decisions. The motion sensor(s) is used detect several safety critical events, such as those noted below:

- Detect unintended motion (e.g., an external agent pushing the cradle manually beyond recommended movements).
- Detect if the acceleration (during vertical or horizontal oscillation of load 190) is higher than usual (due to misbehavior of actuation mechanism 180 or due to some unintended change in mechanical configuration of cradle 100).
- Detect any jerks in the motion and forewarn about any issues in the rocking mechanism. Acceleration of load 190 is continuously sensed and monitored, and deviations from the ideal sinusoidal accelerations expected in a resonant oscillation are detected as jerks.

On detection of one or more of events such as those listed above, processing block 310 stops rotation of motor 140, and sends out alarms. Processing block 310 may send out the alarms for example via a Bluetooth or WiFi transceiver (not shown), but which is implemented as part of the electronics in cradle 100.

7. Gesture-Based Inputs

By moving load 190, the parent/caretaker of the baby 160 can indicate to processing block 310 to initiate oscillations of load 190. The various gestures supported and the corresponding actions are listed below:

Light push of load 190 in horizontal direction—Start rocking load 190 in horizontal direction with pre-input amplitude.

Move load 190 in horizontal direction, then hold and release—Start rocking load 190 in horizontal direction with the amplitude set as per the release position of load 190.

Light push of load 190 in vertical direction—Start rocking load 190 in vertical direction with pre-input amplitude.

Move load 190 in vertical direction, hold and release—Start rocking load 190 in vertical direction with amplitude set as per the release position of load 190.

Impeding the motion of load 190—During motion, if the motion of load 190 is impeded deliberately, the same is detected and rocking is automatically stopped.

Figure 8B:
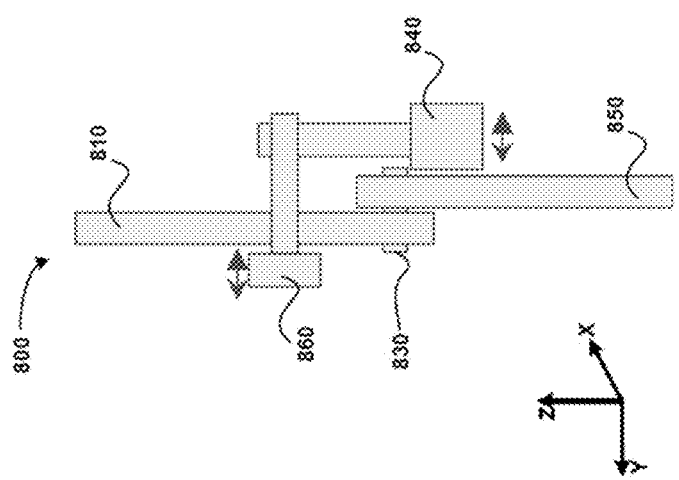
FIGS. 8A and 8B are diagrams showing corresponding views of a generic pivot with damper control used in a cradle in an embodiment of the present disclosure.
Figure 8A:
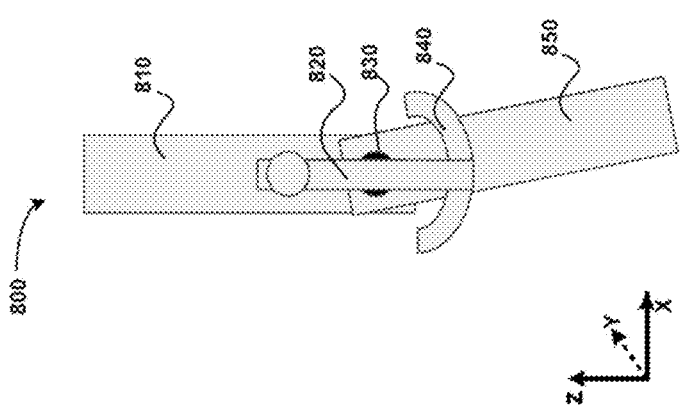

FIGS. 8A and 8B show corresponding views of a generic pivot 800 with damper control that can be used in place of one or more pivots in cradle 100. Elements 810 and 850 are corresponding arms of the generic pivot. Element 830 is a pivot with one degree of rotational freedom. Element 840 is a brush for braking action. Element 820 is another arm to couple brush 840 to knob 860. Knob 860 is used to move brush 840 in or out. When knob 860 is turned clockwise, brush 840 moves out and the pivot is free to operate. When knob 860 is turned anti-clockwise, brush 840 moves in and engages arm 850, and the rotation about pivot 800 is damped.

Although the description above has been provided in the context of a cradle, the techniques described above can in general be extended to provide a generic resonant multidimensional oscillation system, as described next.

8. Generic Resonant Multidimensional Oscillation System

According to another aspect of the present disclosure, a generic resonant, high energy-efficiency system (oscillation system) is presented for inducing oscillatory motion. The mechanism enables 2-axes oscillation by repurposing a single mechanism to work in multiple ways. The actuation mechanism consists of a motor with an eccentric load and an intelligent motor control system that can control the angular velocity and/or angular position of the motor. Using an eccentric load on a motor enables actuation in two directions with a single mechanism. For motion feedback, the control system uses a motion sensor. Any conservative force such as gravity, electric/magnetic or mechanical spring can be used as a restoration force to store the potential energy of the oscillations. An inertial mass can be used as the kinetic energy storage element of the oscillations. In addition, a restricting mechanism is used to prevent unintended motion in the third axis which may be caused due to externally induced forces or leakage of oscillation energy in that axis.

There are many CAM mechanisms in the literature for inducing oscillatory/periodic motion. But most such CAM mechanisms lose all/most of the kinetic energy in every cycle. Also, there are other mechanisms which may use resonance, but they are restricted to one dimension of motion and they usually cannot tune to large changes in the natural frequency of the system. The term "Natural Frequency" refers to the frequency at which a system will oscillate naturally in the absence of external forces. From a functionality point of view, even in a single dimension resonant system, mechanisms are needed to restrict the motion in one direction to make sure that the stand/support structure of the cradle/swing is stable in all operating conditions. Such restriction mechanisms either do not exist in prior art or if they exist, they introduce a lot of friction and hence damp the resonant system, i.e., they reduce the Q factor and increase the power consumption. Q factor refers to Quality factor of a resonant system, and is the ratio of energy stored to the energy lost per cycle in the oscillations The Generic Resonant Multidimensional Oscillation System of the present disclosure enables the following features:

A. Enables multidimensional oscillations using a single actuator.

B. Restricts motion to the desired dimensions.

C. Improves the efficiency of the motion.

Each of the three features A, B and C is now described below.

8.A Multidimensional Oscillations Using a Single Actuator

Figure 10:
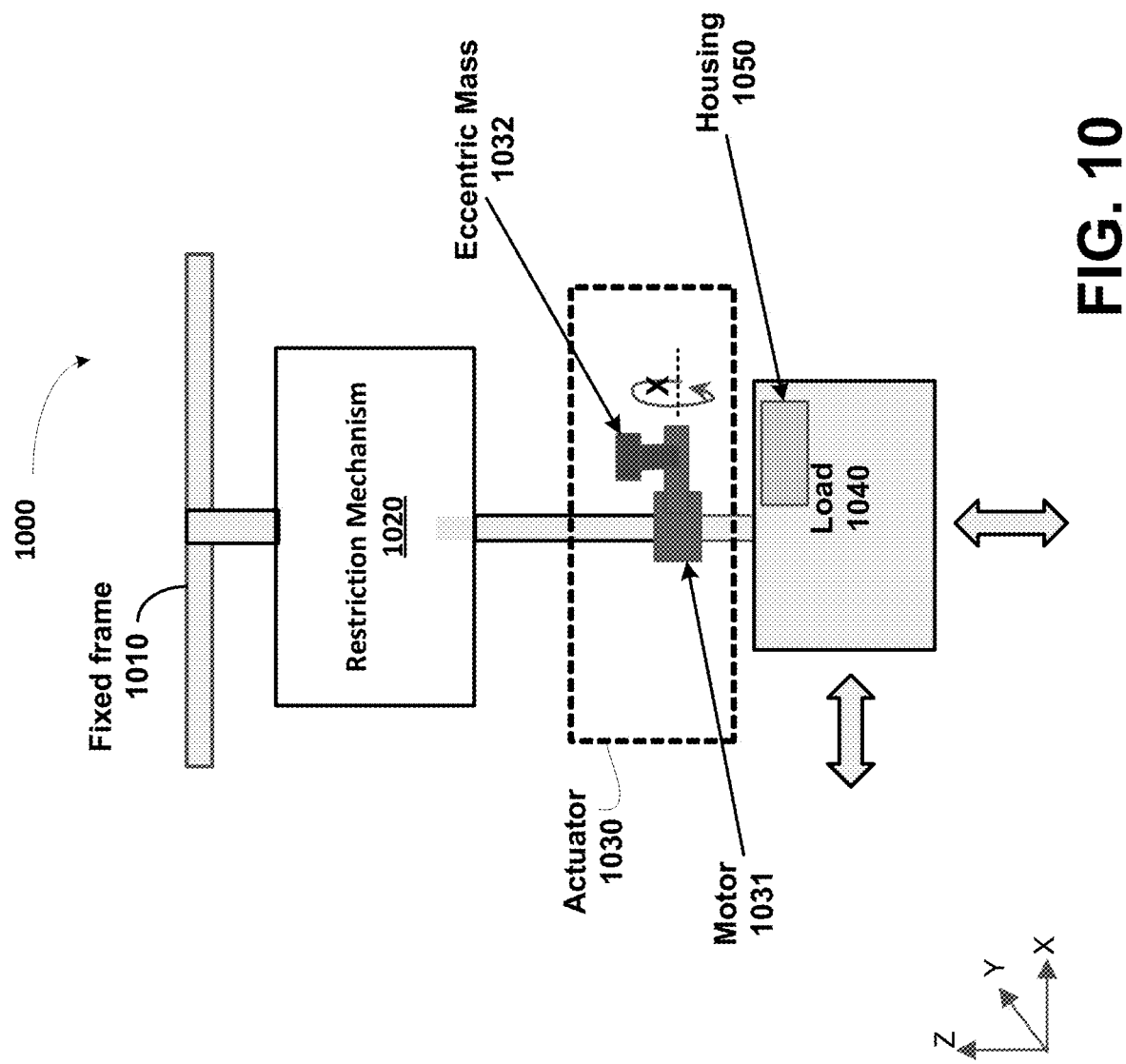
FIG. 10 is a diagram illustrating the details of a generic resonant multidimensional oscillation system, in an embodiment of the present disclosure.

FIG. 10 illustrates the components of a generic system to generate multidimensional oscillations using a single actuator. Oscillation system 1000 of FIG. 10 is shown containing a fixed frame 1010, a restriction mechanism 1020, actuator 1030 (which includes motor 1031 and eccentric mass 1032), and load 1040, which now represents any mass or structure (only one example being that of a cradle as described above) that is desired to be oscillated along one or more axes as described below. Load 1040 may, for example, include structures/mechanisms such as would be used in children's joy rides or swings installed in amusement parks or public children's play areas. Another example of load 1040 can include mechanical test benches in which products under test are subjected to mechanical oscillations.

Figure 12B:
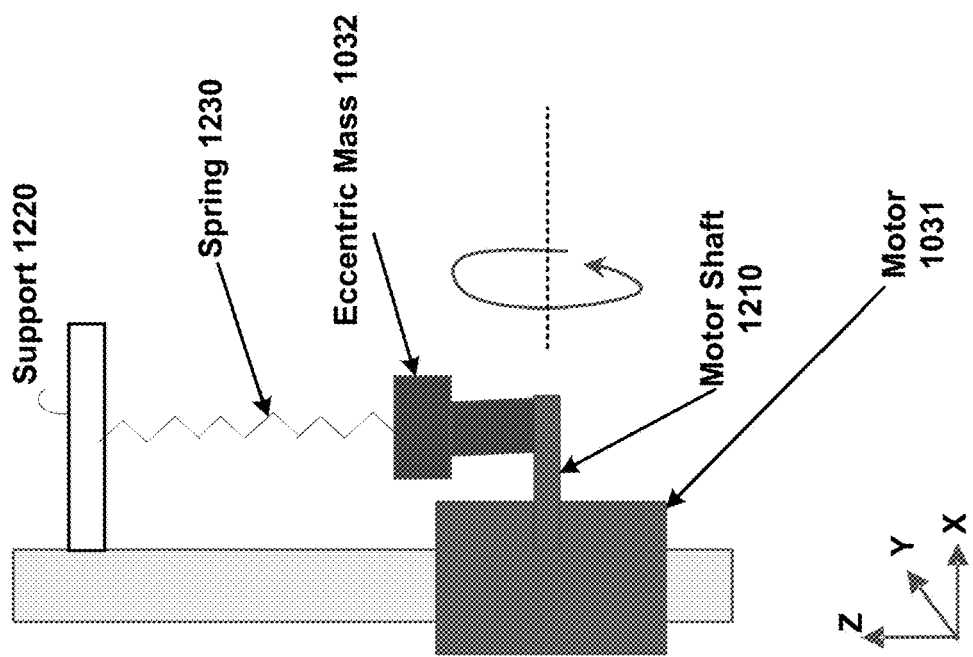
FIGS. 12A and 12B are diagrams providing views of an actuator used in a resonant multidimensional oscillation system.
Figure 12A:
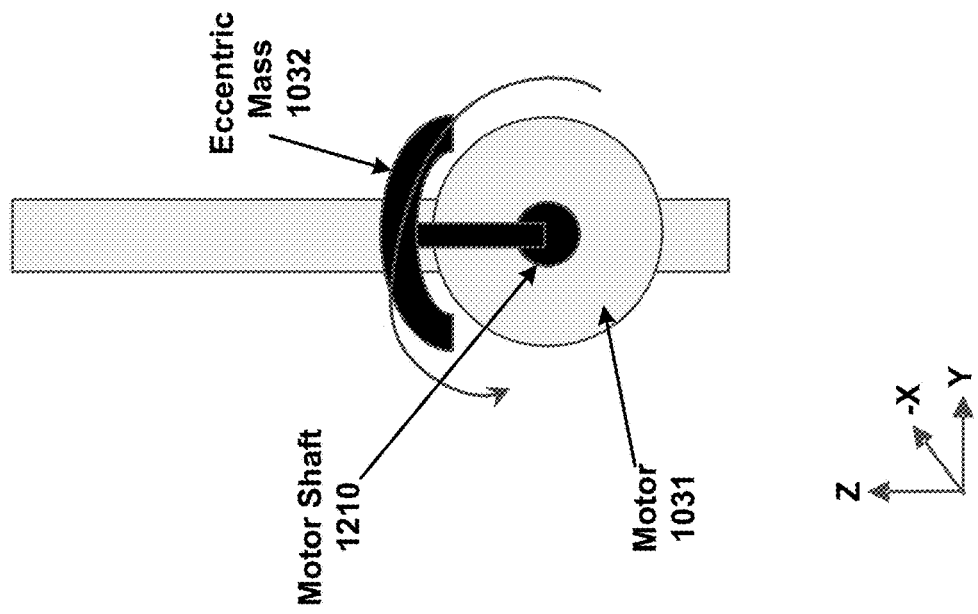

Load 1040 includes a housing 1050 for housing components of a control system as described below. Fixed frame 1010 generally represents a stable surface. The orientation of the X, Y and Z axes is also shown at the bottom left of FIG. 10. FIG. 12A and FIG. 12B provide alternative views of the actuator. In FIG. 12A, 1210 represents the motor shaft, and 1032 represents the eccentric mass. Eccentric mass is connected to support 1220 by a spring 1230 that operates to provide a restoring force. The spring and support are not shown in FIG. 12A in the interest of conciseness.

As can be seen from FIG. 10, motor 1031 rotates eccentric mass 1032 about the X-axis i.e., the eccentric mass 1032 moves in the YZ plane. Due to the rotation of eccentric mass 1032, the direction of centrifugal force exerted by eccentric mass 1032 on the motor shaft undergoes a rotation. Hence a rotating force is applied to load 1040. As is well known, rotation in a plane is equivalent to two simultaneous oscillations in two dimensions. In this case it is the Y and Z dimensions. Therefore, motion actuation is possible in both Y and Z directions using a single mechanism. If the horizontal and the vertical motions are tuned to different frequencies and the Q (quality factor) of the oscillations is high enough, selective oscillations are possible in each dimension by tuning the rotation rate of the motor to match the natural frequency of oscillation in each direction.

Figure 13:
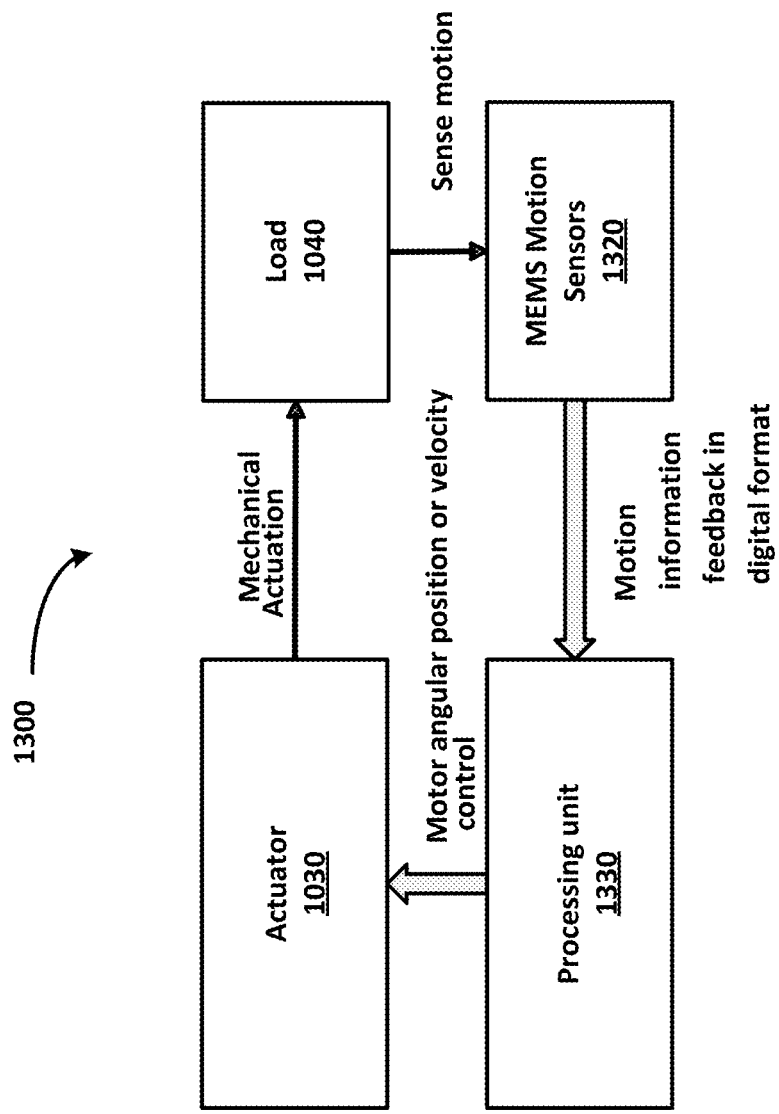
FIG. 13 is a block diagram of a feedback control system used to setup and control oscillations in a resonant multidimensional oscillation system, in an embodiment of the present disclosure.

To setup resonance, feedback may be necessary (as illustrated with respect to FIG. 13). FIG. 13 illustrates a feedback control system to setup resonant oscillations. The system of FIG. 13 is similar to that of FIG. 3, and is shown containing actuation mechanism (actuator) 1030, load 1040. MEMS (micro-electro-mechanical system) motion sensors 1320 and processing unit 1330. Although shown as MEMS, other types of implementations are also possible for motion sensors 1320. Motion sensors 1320 obtain feedback in the form of acceleration experienced by load 1040. Processing unit 1330 computes position and velocity of load 1040 using integration, and operates motor (1031 in actuator 1030). If the motor has position control, processing unit 1330 maintains the phase of the motor such that the force applied is at quadrature with the position of load 1040. If the motor has only velocity control, processing unit 1330 first applies a small actuation to load 1040 by running the motor for a small duration and stopping it. Processing unit 1330 determines the natural frequencies in both directions (Z axis and Y axis) from the small oscillations thus set-up. Then processing unit 1330 runs the motor at the natural frequency(ies) desired to setup the oscillations. Once the oscillations pick up, processing unit 1330 sweeps the motor frequency in a slow manner to maximize the amplitude of oscillations (using typical peak detection techniques). Whether the motor has position control or velocity control, if the amplitude crosses/attains the maximum limit, processing unit 1330 changes the velocity of the motor slowly to operate the system slightly off resonance so that the amplitude is limited to the maximum limit.

In both directions (Z and Y), the frequency of oscillation is decided by the mass of the load and the rates of the restoration force. By tuning the restoration forces to different rates in Y and Z axes, different frequencies of motions can be obtained in each direction. For example, the Y-axis oscillation frequency can be tuned to ~0.66 Hz and the Z-axis oscillation frequency can be tuned to ~1 Hz. To run the system in vertical oscillation mode (i.e., along Z axis), processing unit 1330 runs the motor at 1 Hz. To run the system in horizontal oscillation mode (i.e., along the Y axis), processing unit 1330 runs the motor at 0.66 Hz. To run the system in a vertical+horizontal oscillation mode, processing unit 1330 runs motor in a fashion such that the eccentric mass exhibits a motion that is a combination of the two frequencies. Such a complicated motion with two frequency components is possible if the motor has angular position control, for example, using a stepper motor or a regular speed controlled motor with optical encoder for position feedback. It is also possible for the processing unit 1330 to actuate the load in a time multiplexed manner so that the actuator 1030 alternates between the first axis (Z axis) natural frequency and the second axis (Y axis) natural frequency. In this latter case, it will be sufficient to just have a velocity feedback and position feedback may not be necessary.

The General Expression for Frequency of Oscillation (w) is as Follows:

w=sqrt(k/M), where M represents the mass of (load plus actuator), and k represents restorative force per unit distance.

$$F \text{ (force)} = -k * \text{displacement}$$

It may be noted that the restorative force can be different in different axes (Z and Y) (and be gravity or spring tension, for example, as described in sections above), and thus the value of 'k' in the equation above may be different in the Z and Y directions.

Therefore, by changing k for each dimension (Y and Z), different oscillation frequencies can be obtained.

8.B Restriction of Motion to the Desired Dimensions

As can be seen in FIG. 10, restriction mechanism 1020 is used to make sure that unintended motion in x-axis does not occur. Many such mechanisms are known in the art. One such mechanism as used in an embodiment of the present disclosure is illustrated in FIGS. 11A-11D. The mechanism includes arms L1, L2, L3, L4 and L5 arranged using pivots as shown. Arms L3 and L1 are hinged to fixed frame 1010, while arm L5 supports a load (such as 1040, although not shown in FIGS. 11A-11D. Pivots are represented by the dark colored circles. FIGS. 11A and 11B illustrate the movement of the arms when vertical oscillations (i.e., along Z direction) are setup. FIGS. 11C and 11D illustrate the movement of the arms when horizontal oscillations (i.e., along Y direction) are setup. The operation of the mechanism of FIGS. 11A-11D in restricting motions except in the desired direction is similar to that described above with respect to FIGS. 6A, 6B, 7A and 7B, and the detailed description is not repeated here in the interest of conciseness.

8.C Improved Efficiency of Motion

To begin with, a resonating mechanism is used to implement the oscillations. Hence the power requirements will be much lower compared to a traditional non-resonant mechanism. In addition, to improve the efficiency of the system, higher Q factors are needed. High Q resonant systems need higher mass, higher spring constant and lower friction. But the mass and spring constant are fixed by other parameters of the system. Therefore, minimizing the friction is very important. The restriction mechanism 1020 that restricts the motion is designed to minimize frictions. Alternative mechanisms such as a slider mechanism in the vertical direction have lot of inherent friction in the sliding portion. Restriction mechanism 1020 on the other hand has very minimal friction only in the form of rotation on the vertices of the links (arms) L1 to L5. Rotation inherently has less friction as compared to sliding mechanisms. Thus, the system is very efficient.

9. Ensuring Reliable Operation Using Feedback

Housing 1050 houses the control systems and related electronics. One of the critical components of the control system is the feedback mechanism (illustrated in FIG. 13). The motion sensors consist at the least of an accelerometer and may optionally include a gyroscope. Housing 1050 is mechanically strongly coupled to the load and hence any motion of the load is picked by the motion sensor. The processing unit 1330 continuously monitors the data from the motion sensor and takes critical decisions. The motion sensor is used to detect several safety critical events— a) Detect unintended motion (e.g., an external agent pushing the load manually beyond recommended movements)

b) Detect if the acceleration is higher than usual (due to misbehavior of actuation mechanism or due to some unintended change in mechanical configuration of the system)

c) Detect any jerks in the motion and forewarn about any issues in the oscillation mechanism. Since acceleration is continuously sensed and monitored, deviations from the ideal sinusoidal accelerations expected in resonant oscillation are detected as jerks.

On detection of such events, the processing unit 1330 stops the actuation mechanism (actuator 1030) stopped and sends out alarms (by means not shown). Additionally, it is also possible to have one or more components of feedback control system 1300 to be located entirely outside the load to observe the motion of the load using magnetic, electric, optical or any other kind of position sensing and provide the required signal to the actuator wirelessly.

10. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A system comprising:
    a load subject to a restoring force upon displacement of said load from a rest position; and
    an actuator containing an eccentric mass, said actuator designed to rotate said eccentric mass about a first axis, responsive to the rotation of said eccentric mass, the actuator causing said load to oscillate in the direction of each of a second axis and a third axis, wherein said first axis, said second axis and said third axis are all orthogonal to each other.

2. The system of claim 1, wherein said load comprises a housing for holding an infant, as well as said infant.

3. The system of claim 1, further comprising a mechanism for applying said restoring force, wherein said oscillation is one of a displacement of the entirety of said load in the form of a rotational motion in the direction of said second axis in a first time duration, and a translational motion in the direction of said third axis in a second time duration.

4. The system of claim 3, wherein said actuator is operable to rotate said eccentric mass at a first frequency or a second frequency in respective non-overlapping durations, wherein the natural frequency of oscillation of a first set of components of said cradle along said second axis equals said first frequency and the natural frequency of oscillation of a second set of components of said cradle along said third axis equals said second frequency,
    wherein each of said first set of components and said second set of components includes said load such that said load oscillates only along said second axis when said actuator rotates said eccentric mass at said first frequency, and oscillates only along said third axis when said actuator rotates said eccentric mass at said second frequency.

5. The system of claim 4, wherein said oscillation is selectable to be only either along said second axis or only along said third axis.

6. The system of claim 5, wherein said oscillation is dynamically selectable to be a translational motion in a first time duration and a rotational motion in a second time duration, by controlling the rotational frequency of said eccentric mass to be said first frequency in said first time duration and said second frequency in said second time duration,
    wherein said second axis is a vertical axis and said third axis is a horizontal axis.

7. The system of claim 6, wherein said actuator comprises a motor and said eccentric mass, wherein said eccentric mass is eccentrically loaded to a shaft of said motor,
    wherein said first axis is the axis of rotation of said shaft.

8. The system of claim 1, further comprising:
    a restriction mechanism designed to restrict oscillation to be only possible along said second axis and said third axis.

9. The system of claim 1, wherein said mechanism for applying a restoring force comprises gravity and a mechanical spring.

10. The system of claim 1, wherein said load comprises a structure in a mechanical test bench in which products are subjected to mechanical oscillations.

11. The system of claim 1, wherein said load comprises a structure used in a joy ride or a swing.

* * * * *